(12) United States Patent
Wicha et al.

(10) Patent No.: US 12,198,162 B2
(45) Date of Patent: *Jan. 14, 2025

(54) METHOD, APPARATUS, AND COMPUTER READABLE MEDIUM FOR PROVIDING A SELF-SERVICE INTERFACE

(71) Applicant: Bytedance Inc., Wilmington, DE (US)

(72) Inventors: Francisco Jose Larrain Wicha, Palo Alto, CA (US); Lori E. Kaplan, Menlo Park, CA (US); Matias Esteban Arenas, Mountain View, CA (US); Gaston L'Huillier, Boston, MA (US); Ricardo Andres Zilleruelo Ramos, Mountain View, CA (US); Rodrigo Alfonso Duenas Fernandez, Palo Alto, CA (US); Amit Koren, Chicago, IL (US)

(73) Assignee: BYTEDANCE INC., Wilmington, DE (US)

( * ) Notice: Subject to any disclaimer, the term of this patent is extended or adjusted under 35 U.S.C. 154(b) by 312 days.

This patent is subject to a terminal disclaimer.

(21) Appl. No.: 17/379,367

(22) Filed: Jul. 19, 2021

(65) Prior Publication Data
US 2022/0005080 A1    Jan. 6, 2022

Related U.S. Application Data

(63) Continuation of application No. 16/386,483, filed on Apr. 17, 2019, now Pat. No. 11,100,542, which is a (Continued)

(51) Int. Cl.
G06Q 30/0241    (2023.01)
(52) U.S. Cl.
CPC .............................. *G06Q 30/0276* (2013.01)

(58) Field of Classification Search
CPC .................................................. G06Q 30/0276
See application file for complete search history.

(56) References Cited

U.S. PATENT DOCUMENTS

| | | |
|---|---|---|
| 5,715,445 A | 2/1998 | Wolfe |
| 5,870,770 A | 2/1999 | Wolfe |
| | (Continued) | |

FOREIGN PATENT DOCUMENTS

| | | |
|---|---|---|
| KR | 10-2008-0036829 A | 4/2008 |
| WO | 00/79456 A2 | 12/2000 |
| | (Continued) | |

OTHER PUBLICATIONS

US 6,047,266 A, 04/2000, Van Horn et al. (withdrawn)
(Continued)

*Primary Examiner* — Azam A Ansari
(74) *Attorney, Agent, or Firm* — Alston & Bird LLP

(57) ABSTRACT

Provided herein are systems, methods and computer readable media for programmatically generating and/or revising deal offers for a merchant based on one or more merchant self-service indicators. In providing such functionality, the system can be configured to, for example, facilitate registration and verification of merchant identities, monitor and analyze various deal offers for merchants with similar merchant self-service indicators, that enable the system to determine the relative successfulness of a deal offer for a merchant and/or category of merchant. In some embodiments, the system may be further configured to revise the deal offer programmatically and/or upon receiving the merchant's approval of the programmatically generated proposed edits to the deal offer.

18 Claims, 8 Drawing Sheets

Related U.S. Application Data continuation of application No. 13/749,272, filed on Jan. 24, 2013, now Pat. No. 10,304,093.

(56) References Cited

U.S. PATENT DOCUMENTS

| | | |
|---|---|---|
| 5,946,682 A | 8/1999 | Wolfe |
| 5,948,040 A | 9/1999 | Delorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van et al. |
| 6,604,103 B1 | 8/2003 | Wolfe |
| 6,631,356 B1 | 10/2003 | Van et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,842,719 B1 | 1/2005 | Fitzpatrick et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft et al. |
| 6,934,690 B1 | 8/2005 | Van et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis et al. |
| 7,039,603 B2 | 5/2006 | Walker et al. |
| 7,043,526 B1 | 5/2006 | Wolfe |
| 7,072,848 B2 | 7/2006 | Boyd et al. |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van et al. |
| 7,376,580 B1 | 5/2008 | Walker et al. |
| 7,406,322 B2 | 7/2008 | McMahan et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,520 B1 | 9/2008 | Haugen et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,668,832 B2 | 2/2010 | Yeh et al. |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 | 1/2012 | Kramer et al. |
| 8,108,249 B2 | 1/2012 | Schroeder et al. |
| 8,121,874 B1 | 2/2012 | Guheen et al. |
| 8,131,619 B1 | 3/2012 | Veselka |
| 8,150,725 B2 | 4/2012 | Subramaniam et al. |
| 8,150,735 B2 | 4/2012 | Walker et al. |
| 8,175,908 B1 * | 5/2012 | Anderson .......... G06Q 30/0201 705/7.29 |
| 8,204,797 B2 | 6/2012 | Wanker |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Rana et al. |
| 8,407,252 B2 | 3/2013 | Bennett et al. |
| 8,577,727 B1 | 11/2013 | Harrity |
| 8,590,785 B1 | 11/2013 | Mesaros |
| 8,650,072 B2 | 2/2014 | Mason et al. |
| 8,650,079 B2 | 2/2014 | Fano et al. |
| 8,725,597 B2 | 5/2014 | Mauseth et al. |
| 9,111,323 B2 | 8/2015 | Freeman |
| 9,507,494 B1 * | 11/2016 | Kerr .................... H04W 4/021 |
| 9,934,537 B2 | 4/2018 | Berland et al. |
| 10,235,696 B1 | 3/2019 | L'Huillier et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0123930 A1 | 9/2002 | Boyd et al. |
| 2002/0147663 A1 | 10/2002 | Walker et al. |
| 2002/0178071 A1 | 11/2002 | Walker et al. |
| 2002/0188511 A1 | 12/2002 | Johnson et al. |
| 2003/0004802 A1 | 1/2003 | Callegari |
| 2003/0018559 A1 | 1/2003 | Chung et al. |

(56) References Cited

U.S. PATENT DOCUMENTS

| | | |
|---|---|---|
| 2003/0033587 A1 | 2/2003 | Ferguson et al. |
| 2003/0055765 A1 | 3/2003 | Bernhardt |
| 2003/0233278 A1 | 12/2003 | Marshall |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0071223 A1 | 3/2005 | Jain et al. |
| 2005/0075945 A1 | 4/2005 | Hodge et al. |
| 2005/0080675 A1 | 4/2005 | Lovegreen et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0020512 A1 | 1/2006 | Lucas et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288309 A1 | 12/2007 | Haberman et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040175 A1 | 2/2008 | Dellovo |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2008/0255973 A1 | 10/2008 | El et al. |
| 2008/0270209 A1* | 10/2008 | Mauseth ............ G06Q 30/0201 |
| | | 705/7.29 |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0234710 A1 | 9/2009 | Belgaied et al. |
| 2009/0271270 A1 | 10/2009 | Regmi et al. |
| 2009/0271275 A1 | 10/2009 | Regmi et al. |
| 2009/0307067 A1 | 12/2009 | Obermeyer |
| 2009/0313109 A1 | 12/2009 | Bous et al. |
| 2009/0319362 A1 | 12/2009 | Dashnaw |
| 2010/0049601 A1 | 2/2010 | Walker et al. |
| 2010/0057586 A1 | 3/2010 | Chow |
| 2010/0063870 A1 | 3/2010 | Anderson et al. |
| 2010/0070288 A1 | 3/2010 | Pandey et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0262475 A1 | 10/2010 | Gavriline et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0090080 A1 | 4/2011 | Yu |
| 2011/0099082 A1 | 4/2011 | Walker et al. |
| 2011/0106601 A1 | 5/2011 | Perlman et al. |
| 2011/0112892 A1 | 5/2011 | Tarantino |
| 2011/0153400 A1 | 6/2011 | Averbuch |
| 2011/0173096 A1 | 7/2011 | Bui |
| 2011/0213644 A1 | 9/2011 | Phene |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0258049 A1 | 10/2011 | Ramer et al. |
| 2011/0264490 A1 | 10/2011 | Durvasula et al. |
| 2011/0313840 A1 | 12/2011 | Mason et al. |
| 2011/0313867 A9 | 12/2011 | Andrew |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Walker et al. |
| 2012/0084124 A1 | 4/2012 | Reis |
| 2012/0084128 A1 | 4/2012 | Murphy et al. |
| 2012/0088487 A1 | 4/2012 | Khan |
| 2012/0095817 A1 | 4/2012 | Kamil et al. |
| 2012/0095852 A1 | 4/2012 | Bauer et al. |
| 2012/0101881 A1 | 4/2012 | Taylor et al. |
| 2012/0101889 A1 | 4/2012 | Kurata et al. |
| 2012/0130796 A1 | 5/2012 | Busch |
| 2012/0150603 A1 | 6/2012 | Bennett et al. |
| 2012/0150653 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0284100 A1 | 11/2012 | Goldberg |
| 2012/0303434 A1 | 11/2012 | Postrel |
| 2012/0323661 A1 | 12/2012 | Otto et al. |
| 2013/0024364 A1 | 1/2013 | Shrivastava et al. |
| 2013/0085804 A1* | 4/2013 | Leff ................. G06Q 30/0201 |
| | | 705/7.29 |
| 2013/0124281 A1 | 5/2013 | Evans et al. |
| 2013/0231999 A1 | 9/2013 | Emrich et al. |
| 2013/0254104 A1 | 9/2013 | Fernandez |
| 2013/0275242 A1 | 10/2013 | Ramaratnam et al. |
| 2013/0317894 A1* | 11/2013 | Zhu .................. G06Q 30/0211 |
| | | 705/14.13 |
| 2014/0046757 A1 | 2/2014 | Kahn et al. |
| 2014/0074580 A1 | 3/2014 | Khuchua-Edelman et al. |

(56) References Cited

U.S. PATENT DOCUMENTS

| | | | |
|---|---|---|---|
| 2014/0074595 | A1 | 3/2014 | Chomsky et al. |
| 2014/0095232 | A1 | 4/2014 | Shiva et al. |
| 2014/0114746 | A1 | 4/2014 | Pani et al. |
| 2014/0122200 | A1 | 5/2014 | Granville |
| 2014/0207584 | A1 | 7/2014 | Wicha et al. |
| 2014/0214534 | A1 | 7/2014 | L'Heureux et al. |
| 2015/0046271 | A1 | 2/2015 | Scholl et al. |
| 2015/0278864 | A1 | 10/2015 | McDevitt |

FOREIGN PATENT DOCUMENTS

| | | | |
|---|---|---|---|
| WO | 00/79495 | A2 | 12/2000 |
| WO | 01/08024 | A2 | 2/2001 |
| WO | 01/11483 | A2 | 2/2001 |
| WO | 01/50301 | A2 | 7/2001 |
| WO | 2009/094385 | A2 | 7/2009 |
| WO | 2011/112752 | A1 | 9/2011 |
| WO | 2014/052882 | A2 | 4/2014 |
| WO | 2014/062229 | A1 | 4/2014 |
| WO | 2014/062230 | A1 | 4/2014 |

OTHER PUBLICATIONS

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

Alan S. Davis "Group Buying on the Internet", Seminar Presentation Slides, University of Minnesota, MIS Research Center, Mar. 10, 2006.

Bermant, Charles, "ActBig: Save BiG", Internetnews.com, Nov. 16, 1999, 3 pgs.

Editor, "Technology Drives ActBig 'Next Generation' GroupBuying Application", Market Wire, Feb. 29, 2005.

International Search Report and Written Opinion for Application No. PCT/US2012/027616 dated Sep. 27, 2012.

Kauffman, Robert J. et al., "Bid Together, Buy Together: On the Efficacy of Group-Buying Business Models in Internet Based Selling", paper prepared for the 5th Annual University of Minnesota Electronic Commerce conference, Mar. 27-28, 2001, Carlson School of Management, University of Minnesota, MN, 44 pgs.

Krishnan S. Anand and Ravi Aron (Opim Department, The Wharton School, University of Pennsylvania), "Group Buying on the Web: A Comparison of Price Discovery Mechanisms", Management Science, vol. 49, No. 11, pp. 1546-1562, Nov. 2003.

PCT international Preliminary Report on Patentability for Application PCT/US2013/033145 issued Apr. 21, 2015.

PCT international Preliminary Report on Patentability for Application PCT/US2013/033169 issued Apr. 21, 2015.

PCT international Preliminary Report on Patentability for Application PCT/US2013/062389 issued Mar. 31, 2015.

PCT International Search Report and Written Opinion of the International Searching Authority for application PCT/US2013/062389 mailed May 27, 2014.

PCT international Search Report and Written Opinion of the International Searching Authority for Application PCT/US2013/033145 mailed Jun. 21, 2013.

PCT international Search Report for Application PCT/US2013/033169 mailed Jun. 10, 2013.

PCT Written Opinion of the International Searching Authority for Application PCT/US2013/033169 mailed Jun. 10, 2013.

Rueb, Emily S., "Group Buying, Better Together", The New York Times City Blog, Feb. 16, 2010, 3 pgs.

Staff, "ActBig.com muscles in on group buying power", RedHerring.com, Oct. 13, 1999.

U.S. Patent Application filed Mar. 15, 2013, U.S. Appl. No. 13/832,804.

U.S. Patent Application filed Sep. 28, 2012, In re: Shiva entitled "Scheduling Appointments With Deal Offers", U.S. Appl. No. 13/631,313.

U.S. Provisional Application filed Aug. 13, 2012, In re: Shariff et al. entitled Unified payment and Return on Investment System, U.S. Appl. No. 61/682,762.

U.S. Provisional Application filed Jun. 18, 2012, In re: Kim et al. entitled Facilitating Consumer Payments and Redemptions of Deal Offers, U.S. Appl. No. 61/661,291.

U.S. Provisional Application filed Mar. 30, 2012, In re: Kim entitled "Generating Deal Offers and Providing Analytics Data", U.S. Appl. No. 61/618,338.

U.S. Provisional Application filed May 17, 2013; In re: Kahn et al., entitled Unified Payment and Return on Investment System, U.S. Appl. No. 61/824,850.

U.S. Provisional Patent Application filed Feb. 27, 2013, U.S. Appl. No. 61/770,174.

Kothari et al., Robust Indoor Localization on a Commercial Smart Phone, Elsevier Ltd., 1114-1120, www.sciencedirect.com.

Annex to the communication Mailed on Jan. 31, 2019 for EP Application No. 12752561, 7 page(s).

Annex to the communication Mailed on Sep. 17, 2018 for EP Application No. 12752561, 6 page(s).

Annex to the communication Mailed on Sep. 27, 2017 for EP Application No. 12752561, 4 page(s).

Communication from the Examining Division Mailed on Sep. 27, 2017 for EP Application No. 12752561, 2 page(s).

European search opinion Mailed on Jul. 21, 2014 for EP Application No. 12752561, 2 page(s).

Fu-Ren Lin and Kuang-Yi Chang, "A multiagent framework for automated online bargaining," in IEEE Intelligent Systems, vol. 16, No. 4, pp. 41-47, Jul.-Aug. 2001, doi: 10.1109/5254.941356. (Year: 2001).

IPEA/409—International Preliminary Report on Patentability Mailed on Apr. 9, 2015 for WO Application No. PCT/US13/062389, 7 page(s).

ISA/206—Invitation to Pay Additional Fees Mailed on Mar. 27, 2014 for WO Application No. PCT/US13/062389, 2 page(s).

ISA/220—Notification of Transmittal or Search Report and Written Opinion of the ISA, or the Declaration Mailed on May 27, 2014 for WO Application No. PCT/US13/062389, 1 page(s).

Outgoing—ISA/210—International Search Report and Written Opinion Mailed on May 27, 2014 for WO Application No. PCT/US13/062389, 9 page(s).

Robert J. Kauffman and Bin Wang, "Bid Together, Buy Together: On the Efficacy of Group-Buying Business Models in Internet-Based Selling"; "The (R)evolution Goes Mobile", 5th Annual University of Minnesota Electronic Commerce Conference, Mar. 27-28, 2001, Carlson School of Management, University of Minnesota, Minneapolis Minnesota.

Statement in Accordance With the Notice From the European Patent Office Concerning Business Methods, dated Oct. 1, 2007, 9 pages.

Supplementary European search report Mailed on Jul. 21, 2014 for EP Application No. 12752561, 1 page(s).

T. Bruggemann and M. H. Breitner, "Mobile Price Comparison Services, "Second IEEE International Workshop on Mobile Commerce and Services, Munich, Germany, 2005, pp. 193-201, doi: 10.1109/WMCS.2005.15. (Year 2005).

T. C. Du and H.-L. Chen, "Building a Multiple-Criteria Negotiation Support System," in IEEE Transactions on Knowledge and Data Engineering, vol. 19, No. 6, pp. 804-817, Jun. 2007, doi: 10.1109/TKDE.2007.1018. (Year: 2007).

V. Jayaraman and T. Baker, "The Internet as an enabler for dynamic pricing of goods," in IEEE Transactions on Engineering Management, vol. 50, No. 4, pp. 470-477, Nov. 2003, doi: 10.1109/TEM.2003.820.134. (Year 2003).

U.S. Appl. No. 16/386,483, filed Apr. 17, 2019, U.S. Pat. No. 11,100,542, Issued.

U.S. Appl. No. 13/749,272, filed Jan. 24, 2013, U.S. Pat. No. 10,304,093, Issued.

* cited by examiner

METHOD, APPARATUS, AND COMPUTER READABLE MEDIUM FOR PROVIDING A SELF-SERVICE INTERFACE

CROSS REFERENCE TO RELATED APPLICATIONS

This application is a continuation of U.S. patent application Ser. No. 16/386,483, filed Apr. 17, 2019, which is a continuation of U.S. patent application Ser. No. 13/749,272, filed Jan. 24, 2013 (now U.S. Pat. No. 10,304,093), each of which is incorporated herein by reference in its entirety.

FIELD

Embodiments of the invention relate, generally, to providing an interface to a commerce system and, more particularly, to a method, apparatus, and computer readable medium for providing a merchant self-service interface.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide discounts to consumers have been identified. Initial registration and setup to allow a merchant to provide deals using a deal system is typically a lengthy and involved process. This process may include separate steps by representatives of a deal company to verify that a user who wishes to create a deal is an authorized representative of the merchant, and that deal offers prepared by the merchant are valid and likely to be of interest to consumers. The hands-on nature of the deal generation process means that the process is not scalable as the number of merchants accessing the system increases, since each merchant must interact with a staff member of the deal company for verification, deal generation, and various other steps in the process. As more and more merchants join the system, more and more staff members are required to meet the needs of these merchants in a reasonable time frame.

Through applied effort, ingenuity, and innovation, many of these identified problems have been solved by developing solutions that are included in embodiments of the present invention, many examples of which are described in detail herein.

BRIEF SUMMARY

In general, embodiments of the present invention provide herein systems, methods and computer readable media for programmatically registering and verifying a merchant, and allowing the merchant to generate and/or revise deal offers. In providing such functionality, the system can be configured to, for example, monitor and analyze various deal offers, including current deal offers and analytics data about deal-related purchases, that enable the system to determine the relative successfulness of a deal offer for a merchant and/or category of merchant. These deal offers may be indexed with a set of merchant self-service indicators, such that when a new merchant registers with the system, the system determines the merchant self-service indicators for the newly added merchant and suggests deals associated with those merchant self-service indicators. Upon determining what has been more successful or is expected to be a more successful deal offer for the merchant based on the merchant self-service indicators, the system can present the deal offer to the newly registered merchant for approval and/or make the deal offer to consumers programmatically by a promotional system located remotely from the merchant device and the consumer device. In some embodiments, the remotely located promotional system may be further configured to revise the deal offer programmatically and/or upon receiving the merchant's approval of the proposed edits to the deal offer.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 2:
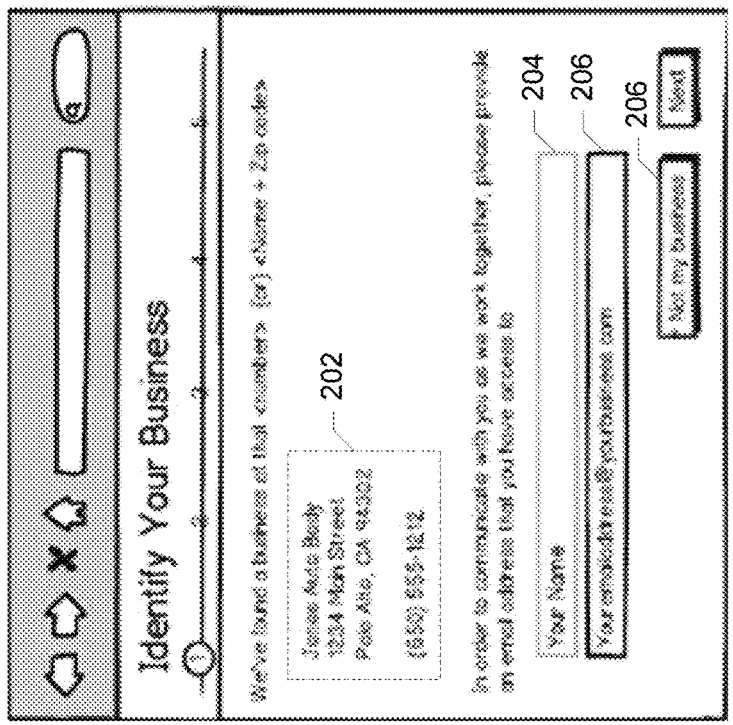
FIGS. 1-8 show example graphical user interface displays that may be presented by various components of systems in accordance with some embodiments discussed herein.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIGS. 1-8 show example displays that may be presented by one or more display screens of one or more machines, sometimes referred to herein as "merchant devices," in accordance with some embodiments discussed herein. For example, the displays of FIGS. 1-8 can be presented to a merchant by desktop or laptop computer, or by a mobile, handheld merchant device. These displays may aid in facilitating the registration and verification of a merchant with a promotional system. These displays may further assist with generation of a coupon and/or other discount offer for the merchant's products and/or services, which are sometimes referred to herein as "deal offers" or, more simply, "deals." The deals generated in accordance with some embodiments discussed herein can then be presented to one or more consumers using machines, which are sometimes referred to herein as "consumer devices."

The displays of FIGS. 1-8 can be used to provide a relatively simple, quick, and intuitive way for the merchant to register with a promotional system and to create deals by using the promotional system. For example, the promotional system may include one or more third party computer devices. Further examples of ways for the merchant to create deals and for a consumer to redeem deals are discussed in commonly-assigned U.S. Patent Application Publications No. 2011/0313840, filed Mar. 17, 2011, titled "SYSTEM AND METHODS FOR PROVIDING LOCATION BASED DISCOUNT RETAILING,", and Provisional U.S. Patent 61/618,338, filed Mar. 30, 2012, titled "GENERATING DEAL OFFERS AND PROVIDING ANALYTICS DATA,", which are hereby incorporated by reference in their entirety.

The displays of FIGS. 1-8 can be used to register a merchant with the promotional system, to verify that the user is an authorized representative of the merchant, and to create deals for products based on merchant self-service indicators associated with the merchant. In the context of the present application, the term "merchant self-service indicator" relates to data associated with the merchant that may be used to identify a set of deal parameters for suggesting a deal to the merchant. For example, the merchant self-service indicator may be a feature or characteristic of the merchant, such as a the type of industry of the merchant, the type of products or services sold by the merchant, the size of the merchant, the location of the merchant, the sales volume of the merchant, reviews and ratings for the merchant, or the like. In some embodiments, the merchant self-service indicators are a result of analytics that allow for generation of deals that are ideal for the particular merchant's circumstances. For example, the merchant self-service indicators may be used to identify optimal deals for the particular merchant based on their exact location (e.g. the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the like. These merchant self-service indicators may be used to identify deal parameters that were used by other merchants that share one or more same or similar merchant self-service indicators. For example, after initial registration and verification, the promotional system may identify the merchant self-service indicators associated with the newly registered merchant, such as by looking up the merchant in a merchant database or by receiving the merchant self-service indicators directly from the merchant (e.g., by a fillable form). The identified merchant self-service indicators may be cross-referenced with deal offers from other merchants to identify deal offers that were successful for other merchants with the same or similar merchant self-service indicators. Successful deal offers for merchants with similar merchant self-service characteristics may be used to generate a suggested promotion for the newly registered merchant, and the newly registered merchant may confirm the suggested promotion to offer the promotion to consumers via the promotional system. The promotional system may also provide an interface allowing the merchant to edit or otherwise modify the suggested promotion before confirmation.

Figure 8:
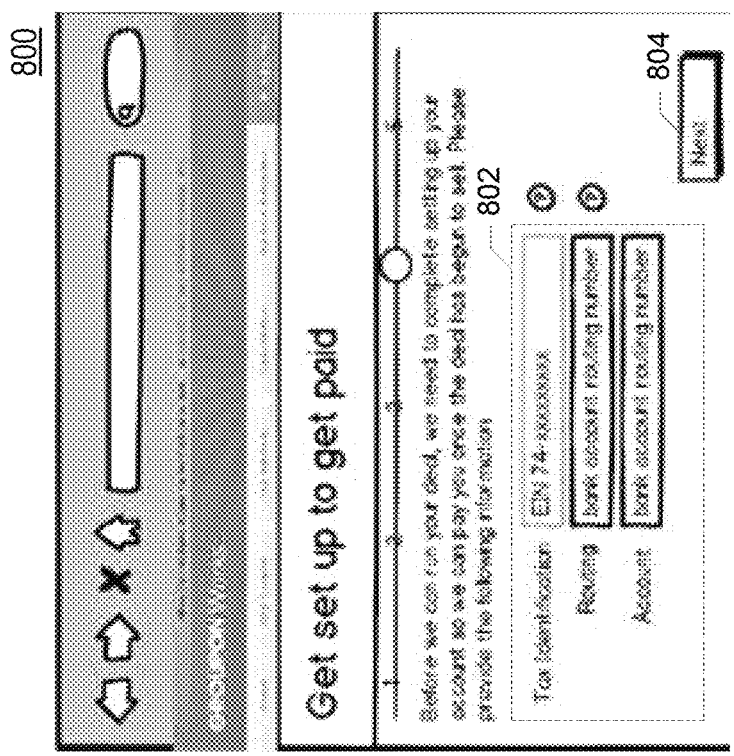
Figure 9:
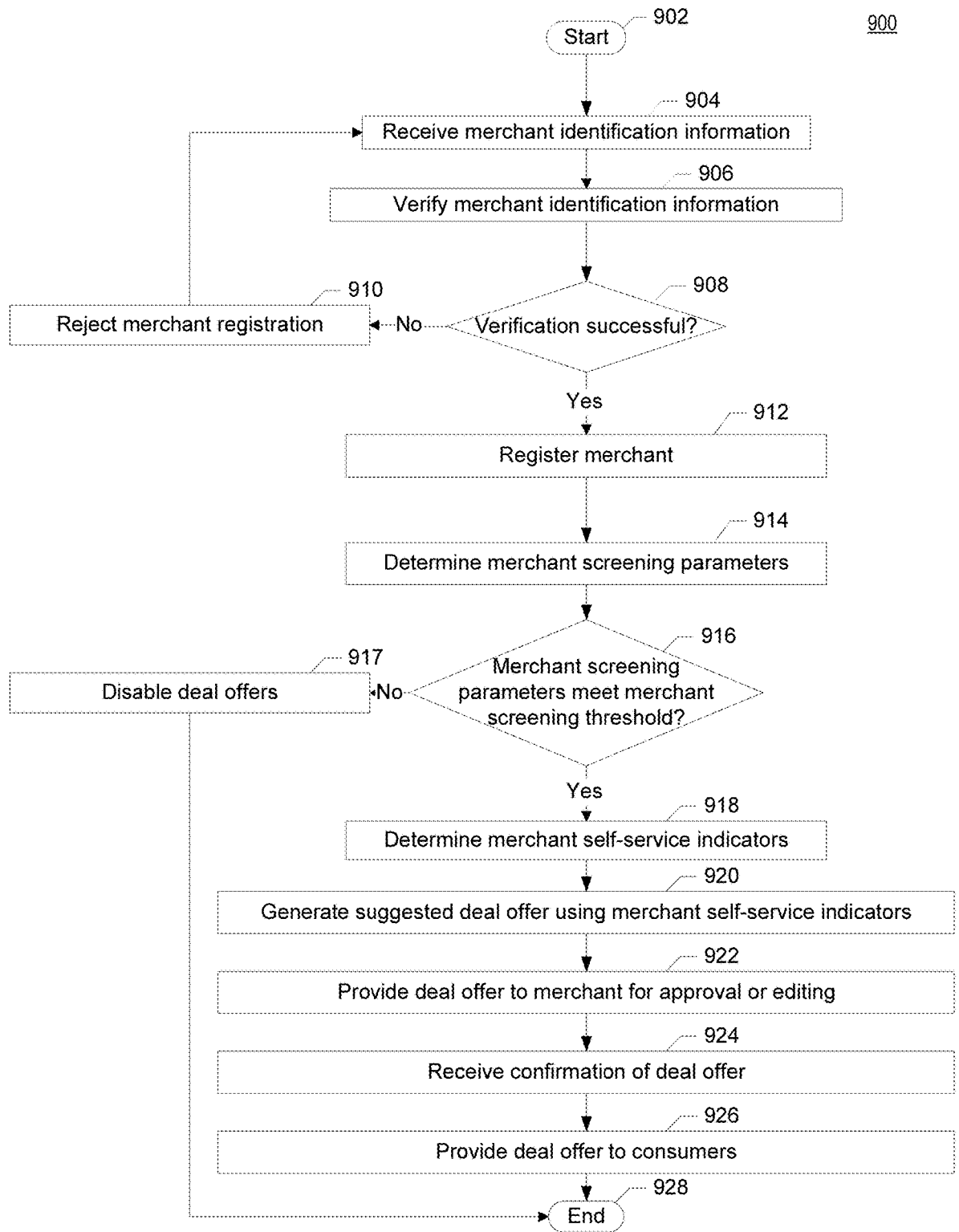
FIGS. 9-11 are flow charts showing exemplary processes of registering a merchant, verifying the merchant, and programmatically generating a deal in accordance with some embodiments discussed herein.
Figure 10:
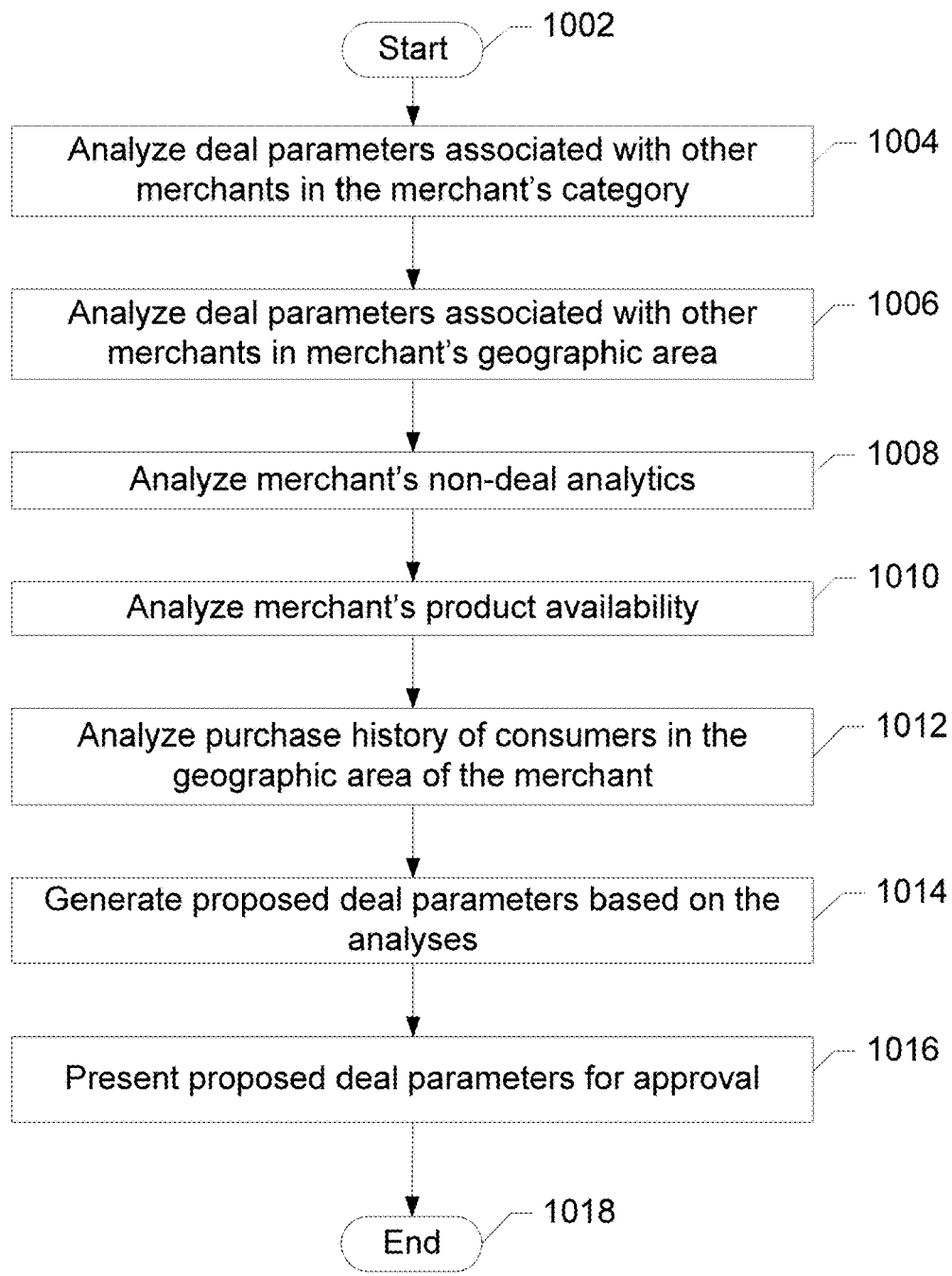
Figure 11:
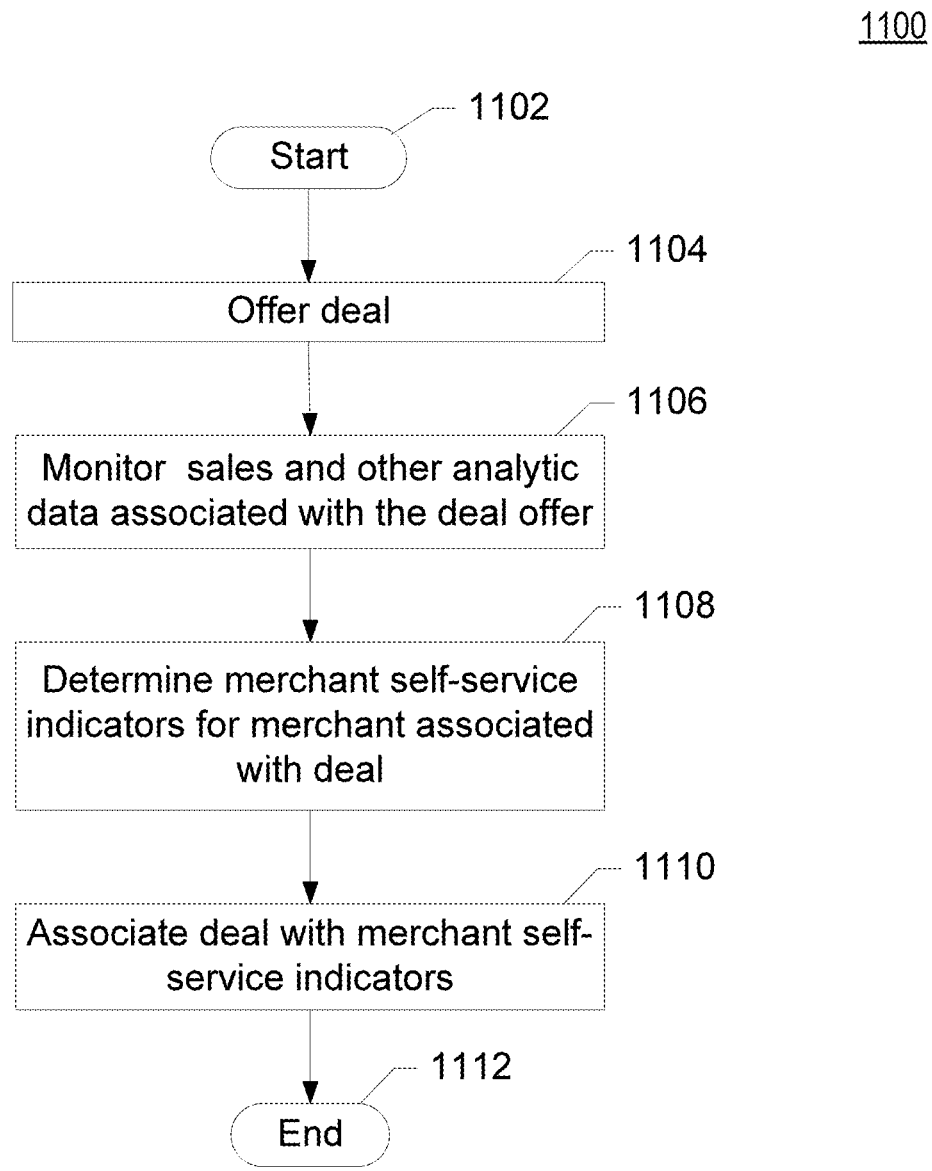

FIG. 9-11 show example methods, namely processes 900, 1000, and 1100, that may be executed by one or more machines (some examples of which are discussed in connection with FIGS. 12 and 13) to provide the displays of FIGS. 1-8, among others, in accordance with some embodiments discussed herein. These processes may be performed by computing devices as known in the art and described below with respect to FIGS. 12 and 13.

Figure 1:
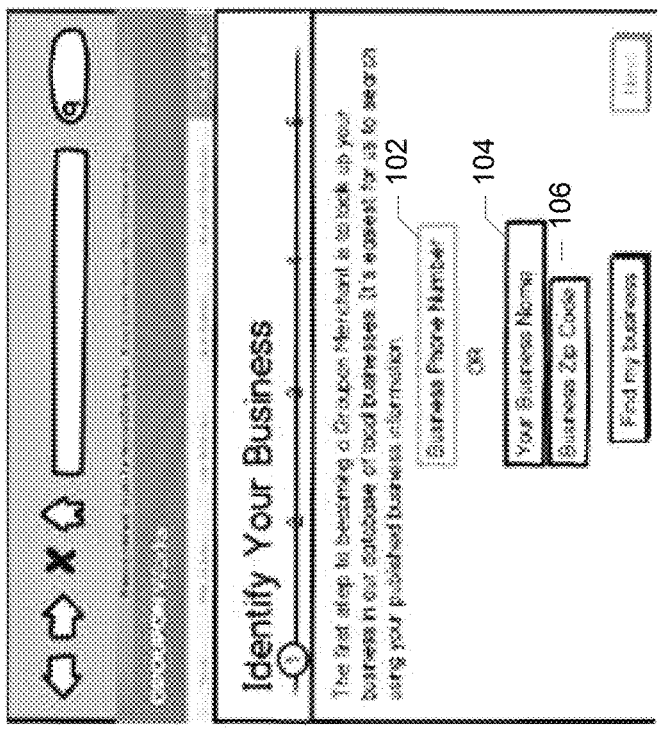

FIG. 9 depicts an example method for providing merchant self-service. The process 900 begins and waits for a user's indication that they wish to register as a merchant, such as by receiving merchant identification information at action 902. Users may arrive at an interface for registering with a promotional system in a variety of manners. For example, the user may perform an Internet search such as "Restaurant Deal Promotions" and arrive at a link to a website managed by the promotional system, or the user may be aware of the promotional system and navigate directly to the promotional system's website. In some embodiments, users may be brought to the promotional system by a marketing campaign (e.g., a direct e-mail, phone call, or the like). Merchants may, for example, be provided with a customized interface (e.g., a custom uniform resource locator) that may pre-complete certain fields, forms, or other data, such as the merchant identification information. In one example, the display 100 of FIG. 1 is shown as including a series of fields 102-106 allowing the user to enter merchant identification information to be provided to a promotional system. The merchant identification information may include the name of the merchant 104, the merchant's address 106, the merchant's phone number 102, the merchant's zip code (not shown), the merchant's e-mail address (not shown), or any other information that may be used to identify the merchant. In some embodiments, the promotional system may independently determine some or all of the merchant identification information, such as by accessing a browser cookie associated with the user's browsing session or by identifying the internet protocol address used by the user.

The display 100 (and other exemplary displays such as depicted in FIGS. 2-8) may allow for input of such information as described relative to action 902. For example, the display 100 may be presented by a merchant device, such as a web browser executing on a desktop, laptop, or tablet computer, as a mobile application on a mobile device, or via any other format suitable for allowing the user to access the promotional system.

At action 904, the merchant identification information is verified. Verification of the merchant identification information ensures that the user is authorized to generate promotions on behalf of the merchant. This step is generally desirable in order to ensure that deal offers generated using the promotional system will be honored by the merchant. For example, without verification or other security controls, it might be possible for an unauthorized user to generate deal offers for a merchant without that merchant's knowledge.

Figure 4:
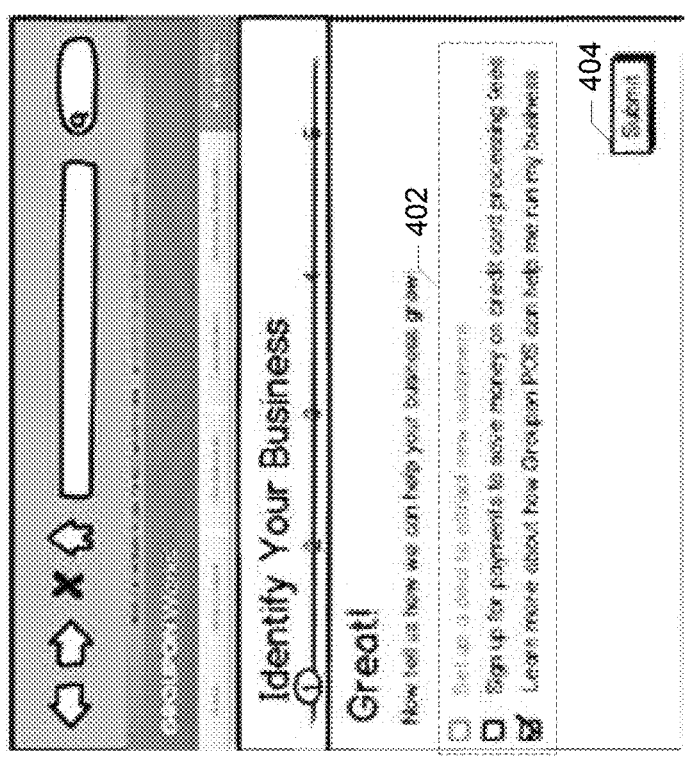
Figure 3:
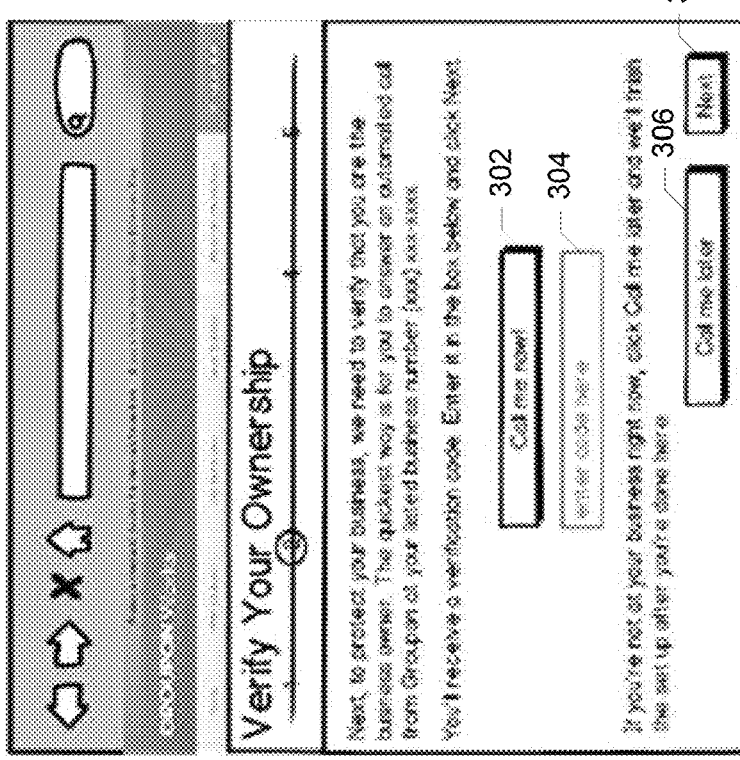

The displays 200-400 as depicted in FIGS. 2-4 provide an exemplary set of interfaces for performing the verification process described in action 904. The display 200 depicts a screen that might be displayed after the user has provided the merchant identification information described with respect to action 902. The display 200 shows the results 202 of a lookup operation performed on the merchant identification information, to attempt to identify a merchant associated with the merchant identification information. For example, a merchant name and address may be used in conjunction with a merchant database to identify contact information for the merchant with that name at that address. In some embodiments, the merchant may also be asked to select or confirm other merchant self-service indicators. For example, the merchant database may include a merchant category (e.g., restaurants, hotels, bed-and-breakfasts, nail salons, etc.), a list of goods and services offered by the merchant (e.g., a single merchant, such as a hotel, might offer golf outings, rooms for overnight stays, restaurant reservations, and spa treatments), and other merchant self-service indicators that are known, suspected, or suggested for the particular merchant. The merchant may be prompted to add, edit, select, confirm, or delete these indicators to update the merchant database with these self-service indicators. In some embodiments, these merchant self-service indicators may be derived by accessing a website associated with the merchant to initially populate the merchant database.

In some embodiments, if the promotional system is unable to identify the merchant from the merchant identification information, the user may be provided with a prompt to register via an alternative method. For example, if the merchant has just opened a new location and the new location is not yet stored in the merchant database, then the promotional system may provide for manual verification by a staff member. In such a case, the promotional system may display an error message, requesting the user to submit the merchant for manual verification.

The display 200 may also provide fields 204-206 for the user to enter their name 204 and an e-mail address 206 to be associated with the merchant registration. The user name and e-mail may also be used with a notification system to verify that the user is an authorized representative of the merchant as will now be described in further detail. The display 200 may further provide for an interface control 208 for the user to indicate that the result of the lookup operation is erroneous. The display 300 provides an interface for contacting the merchant using an alternative contact method other than that provided by the interface through which the user is accessing the promotional system. This alternative contact information may describe a "verified" or "known good" method of reaching the merchant, such as an official phone number, address, e-mail address, IP address, or the like associated with the merchant. The merchant database may contain information identifying such "verified" contact methods, or the promotional system may determine the verified contact methods by other means, such as by accessing the merchant's website.

The user may be prompted to select an interface control 302 to initiate contact via the verified contact method. For example, the display 300 provides an interface control 302 that initiates a phone call to a telephone number associated with the merchant as retrieved from the merchant database. The initiated phone call may include a recording that provides a verification code to the user. Upon receiving the phone call, the user is provided with the verification code for entry using an interface field 304 depicted in the display 300. The display 300 may also provide for an interface control to continue the verification process later, such as via the "call me later" control 306 depicted in the display 300. Upon entry of the verification code, the user may proceed to the next step via a "next" interface control 308.

At action 908, the process 900 determines whether the verification process was successful. If the user successfully completes the verification process (e.g., the user enters the proper code as received during the telephone call), the user may be presented with a confirmation screen, such as the screen depicted in the display 400. The confirmation screen may include a series of selections 402 allowing the user to select particular options for their account. For example, the user may indicate that they wish to receive further information about particular products or services offered by the promotional system, or that they wish to initiate particular deal offers. Upon selection of these options, the user may confirm the selections and proceed to the next step via a "submit" interface control 404. The process 900 may then proceed to action 912, where the merchant is registered with the promotional system.

Figure 5:
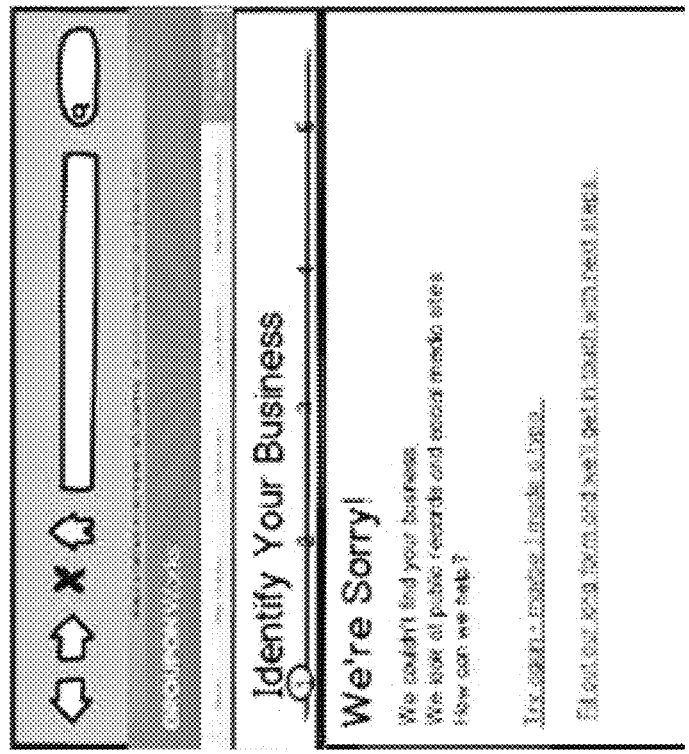

If the verification process is unsuccessful because the code is entered incorrectly or because the business cannot be found, then the process proceeds to action 910. At action 910, the user is informed that the registration process has failed. For example, the user may be presented with an error screen, such as depicted with respect to the display 500 as shown in FIG. 5. The process 900 then returns to action 902 to await new merchant identification information.

If the verification process is successful, at action 912 the merchant is registered with the system. The registration process may include establishing account credentials for the user, such as a user id and password. The account credentials may be associated with the particular merchant, such that a user that logs in with said account credentials is provided with account permissions to create deals on the merchant's behalf. In some embodiments, user accounts are provided with various permission levels. For example, a business owner may establish an administrator account (e.g., account credentials for the owner), and multiple additional accounts with reduced permissions (e.g., deals created by the additional accounts must be approved by the owner, or the additional accounts may not be able to create deals with a value in excess of a certain dollar amount, or the like). The process 912 then proceeds to action 914.

At action 914, the process 900 may determine a set of merchant screening parameters. The merchant screening parameters may provide a mechanism to filter merchants before allowing merchants to provide deal offers via the promotional system. For example, if merchants have proven to be unreliable in the past, or have not honored previous deal offers, then the merchants may be prevented from generating new deal offers. The merchant screening parameters may thus function as a sort of merchant "credit check" to determine if the merchant will be allowed to provide deal offers using the promotional system. Various factors may be utilized for the merchant screening parameters, including but not limited to the size of the merchant, the age of the merchant, an average review score (e.g., a review score as provided by merchant review websites), a social networking metric (e.g., a number of "Likes" or other approval metrics received on a merchant social networking page), the number of locations the merchant maintains, the merchant credit score, a merchant risk model determined by a various factors, or any other factor that may indicate the merchant is or is not a good candidate for providing deal offers. The merchant screening parameters may be determined by the promotional system, or in communication with an external system or systems. In some embodiments, merchants are identified within the merchant database as whether or not the merchant is qualified to provide deal offers, such that the merchant is instantly notified whether they have qualified upon registration.

At action 916, a determination is made as to whether the merchant screening parameters meet a particular merchant screening threshold. Although the term merchant screening threshold may be understood to relate to a minimum metric value for providing deals via the promotional system, the merchant screening threshold may additionally or alternatively involve other methods of weighting and measuring the merchant screening parameters. For example, a particular merchant screening parameter or parameters may act as flags which, if present, immediately qualify or disqualify the merchant from creating deal offers via the promotional system. One or more of the merchant screening parameters may be combined to generate a merchant quality score, which is then compared against a minimum quality score to determine if the merchant has passed the merchant screening threshold. Calculation of the merchant quality score may include a formula using a plurality of different merchant screening parameters, and the merchant screening parameters may be assigned particular weights. Certain merchant screening parameters may be weighted more heavily for certain industries or merchant types than others. For example, food critic reviews may be weighted more heavily for a fine dining restaurant than for a fast food restaurant as a judge of the quality of the particular merchant, or the merchant screening threshold may be lowered or eliminated in particular markets that do not have many merchant participants. The process 900 proceeds to action 917 if the merchant screening parameters fail to meet the merchant screening threshold. If the merchant screening parameters meet or exceed the merchant screening threshold, the process 900 proceeds to action 918.

Figure 6:
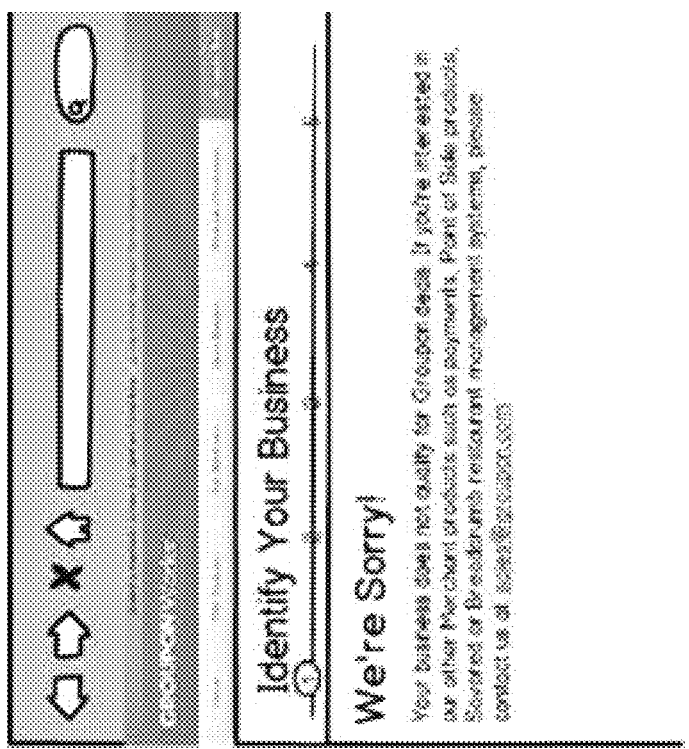

At action 917, the user may be presented with a display indicating that they are not eligible to create deal offers. For example, the display 600 as depicted with respect to FIG. 6 provides a message to the user indicating that the merchant will not be able to create deal offers using the promotional system.

At action 918, once the merchant has been verified as meeting the merchant screening threshold, one or more merchant self-service indicators are determined for the merchant. As described above, the merchant self-service indicators provide data about the merchant that may be used to suggest appropriate deal recommendations to the merchant. These merchant self-service indicators may include various characteristics about the merchant, such as the merchant size, location, industry, and the like. In some embodiments, this information may be provided manually by the merchant during the registration process. Additionally or alternatively, the merchant self-service indicators may be accessed or derived by the promotional system from the merchant identification information. For example, the merchant identification information may be used to identify the name, address, industry, and goods and services sold by the merchant by using the merchant database as described above. The merchant database may further include other merchant self-service indicators, such as merchant size, number of locations, and the like. As yet another alternative or additional method of obtaining merchant self-service indicators, the promotional system may access various third party websites and/or databases to identify the merchant self-service indicators once the identity of the merchant has been ascertained. After identifying the merchant self-service indicators, the process 900 proceeds to action 920.

At action 920, a deal offer is generated using the merchant self-service indicators. Generation of the deal offer may include selecting certain deal parameters and deal content based on the merchant self-service indicators. As used in the present application, the term "deal parameters" may be understood to refer to structural properties of the deal offer, such as the discount level offered, the quantity of deal offers to make available to consumers, the duration of the deal offer, the terms and conditions associated with the deal offer, pricing between the merchant and the promotional system, a return on investment or profit margin for the deal, and the like. The term "deal content" may be understood to refer to cosmetic display factors that influence how the deal is displayed to consumers. For example, deal content may include an image associated with the deal, a narrative description of the deal or the merchant, a display template for association with the deal, or the like. For example, the merchant self-service indicators may be used to identify deal offers that were generated by merchants with similar characteristics to the merchant self-service indicators. Various other factors may be used to generate the deal offer, such as the success of the deal offers generated by the merchants with similar characteristics, the product availability of the merchant, and the like.

Different merchants may receive different pricing from the deal system based on different factors. For example, merchants that have higher sales volume (and thus are more likely to sell deal offers), or that are perceived as higher quality (and thus are more desirable) may be offered preferable pricing over smaller or lower quality merchants. In this regard, the promotional system may adjust the pricing of deal offers based on the merchant self-service characteristics to adjust pricing for the particular merchant. For example, the price of deal offers offered to the merchant may be adjusted so that the merchant is guaranteed a positive return on their investment, deal offer prices may be adjusted based on the size or volume of the merchant, or any other adjustment may be made to the deal offer parameters as appropriate for the merchant self-service indicators of the particular merchant. Additionally or alternatively, deal content, such as deal narratives, images, or other cosmetic features that are presented to a user in connection with the deal offer, may also be generated using the merchant self-service indicators.

An example process for generating a deal offer using one or more merchant self-service indicators is described further below with respect to FIG. 10. After generating the deal offer, the process 900 proceeds to action 922.

At action 922, the deal offer is provided to the user as a suggested deal offer. The deal offer may be presented to the merchant via a display such as the display 700 depicted with respect to FIG. 7. The display 700 may further provide the user with the ability to edit or otherwise modify the deal before submitting the deal to be presented to consumers. For example, the merchant may modify the discount level of the deal offer, the price of the deal offer, the quantity of the deal available, various terms and conditions of the offer, or any other parameters associated with the deal offer. An interface to edit these deal parameters is provided by a series of interface controls 702 as depicted with respect to the display 700. The user may also preview an image of the deal via a preview window 704. The user may confirm the deal parameters using a confirmation interface control 706. As described above, the parameters of the generated deal may be derived from other deals that have been created by other merchants with the same or similar characteristics to the newly registered merchant. For example, a restaurant may be presented with deal parameters that provide a similar discount levels to other restaurants near their location, to other restaurants of a similar type (e.g., sushi restaurants, Mexican restaurants, etc.), to other restaurants with a similar sales volume, or any combination of factors. In this manner, the user may be provided with a good "starting point" for generating a deal offer for use with the promotional system.

As described above, the merchant may also be provided with cosmetic deal content, such as a suggested stock image and narrative for the provided deal offer. The display 700 may also provide for the ability to upload their own image, to adjust the deal narrative, or to add, edit, delete, or confirm any additional deal content associated with the deal.

In some embodiments, the merchant may be presented with a plurality of deal offers for selection and/or confirmation. For example, the promotional system may identify several deal offers that may be appropriate for the merchant based on the merchant self-service indicators, and allow the merchant to select, edit, and/or confirm one or more of the identified deal offers. In some embodiments, the merchant may be presented with different deal offers for various products and services offered by the merchant. For example, a hotel that offers golfing, restaurant dining, and overnight rooms may be presented with separate deal offers for golf outings, dinner discounts, and room discounts, respectively. In this manner, the merchant may be provided with the ability to promote particular products or services based on their particular needs. Deal offers may also be presented to the merchant based on other factors, such as the demand for particular deals, deal offers being offered by competitors in the same or similar markets, or various other factors that might result in generation of appropriate deals for the merchant.

After presenting the deal to the user, the process 900 may proceed to action 924, where the process may wait until receiving approval of the deal offer from the user.

At action 924, the user may confirm that the deal offer is acceptable. As described above, this approval may come after the merchant has edited the deal offer, such that the edited deal is approved rather than the originally generated deal offer. The approval process may also include the user providing payment information, agreeing to contract terms, or any other actions that may be necessary to provide the deal offer to consumers. The display 800 as depicted with respect to FIG. 8 shows an example of one such interface, where the user is prompted to enter payment information via a set of payment information entry fields 802 to ensure that the merchant is paid for the deal offers purchased by consumers. For example, the user may provide tax identification information, bank account information, and the like. The various other interfaces may provide a signature capture pad or other means for displaying and receiving confirmation of contract terms, a final review and approval screen, or any other interfaces that may be beneficial for finalizing the deal offer. Once the deal offer is confirmed at action 924, the method proceeds to action 926 whereby the deal offer is provided to consumers.

At action 926, the deal offer may go "live" in that it is made available to consumers via the promotional system. At this point consumers may select and purchase the deal offer for redemption with the merchant. Various methods of redemption may be offered such as but not limited to physical printing of a coupon to provide to the merchant, the display of a quick recognition (QR) code for scanning at the merchant point-of-sale, the use of near-field communications (NFC) or another wireless protocol to transmit the deal offer to the merchant, or the like. In some embodiments, redemption is performed by the same merchant system used to initially register and verify the merchant and to generate the deal.

The process 900 ends at action 928, after providing the newly generated deal to consumers. Although the process 900 is describing as ending only after providing the newly generated deal to consumers, it should also be appreciated that the process 900 may include various options and alternatives for exiting before providing the newly generated deal. For example, a newly registered merchant may complete the verification process, but stop short of issuing a new deal offer on their first login. Instead, the merchant may choose to exit and return later to generate the deal offer.

Figure 7:
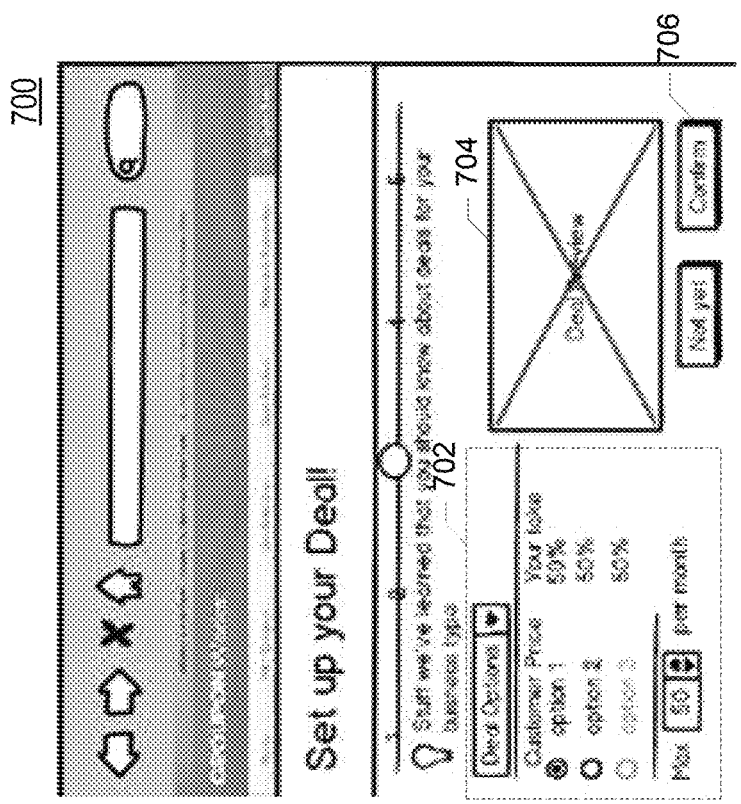

FIG. 10 shows process 1000, which is an example of an algorithm that may be used to automatically generate programmatically proposed deal offer parameters based on merchant self-service indicators such as presented by display 700 of FIG. 7. In some embodiments, the deal parameters may be presented or otherwise previewed to the merchant in a display (such as display 700) each time the parameters are outputted by process 1000. In other embodiments, the deal parameters may not be presented or otherwise previewed to the merchant in a display (such as display 700) each time the parameters are outputted by process 1000. The process 1000 may be performed in response to an initial merchant registration, such as described above with respect to the process 900 described in FIG. 9. For example, upon initial registration, the process 1000 may generate a deal offer from merchant self-service parameters identified or otherwise derived using merchant identification information provided during the registration process. The actions of the process 1000 describe various merchant self-service indicators such as merchant category, geographic area, customer purchase histories, and the like. Although several specific merchant self-service indicators are enumerated, this should not be understood to be an exhaustive list, and various other merchant self-service indicators or combinations of merchant self-service indicators may also be employed to identify suggested deals for merchants during the initial registration process. The process 1000 begins at action 1002.

At 1004, the process may analyze deal parameters associated with other merchants in the merchant's category. For example, the promotional system can promote a plurality of merchants that are categorized together by the promotional system. For example, the promotional system may offer deals and/or otherwise promote businesses that provide spa treatments. Each of these businesses can be categorized by the promotional system as a spa. As another example, businesses that serve food and drink after payment is received can be categorized as a "Deli/Coffee Shop" by the promotional system. In some embodiments, there may be broader categories and/or sub-categories. For example, a "Spa" category may include a subcategory for a "Facial Specialist," and itself may be a subcategory for the broader "Health and Beauty" category. As another example, a "Deli/Coffee Shop" category may be a subcategory of a "Restaurants" category, which may itself be a subcategory of a "Food and Drink" category. Deal parameters for each category/subcategory of merchants can be assigned a value related to how successful or unsuccessful they are (e.g., how well they sell and how much profit they make the respective merchant), and can be used in determining proposed parameters for the merchant benefiting from process 1000. In this manner, deal parameters employed by other merchants in the same category as the newly registered merchant may be used to generate an initial deal for the newly registered merchant.

At 1006, the processor can be configured to analyze deal parameters associated with other merchants in the merchant's geographic area. For example, certain neighborhoods may attract people willing to spend more money than other neighborhoods. The promotional system can be configured to take into consideration the merchant's neighborhood when determining proposed deal parameters. Additional examples of providing real-time deal offers within a merchant's vicinity are discussed in previously-incorporated, commonly-assigned U.S. Patent Application Publication No. 2011/0313840, filed Mar. 17, 2011, titled "SYSTEM AND METHODS FOR PROVIDING LOCATION BASED DISCOUNT RETAILING."

At 1008, the processor can be configured to analyze non-deal analytics associated with the merchant. For example, the merchant's point-of-sale device can be configured to report some or all of the sales information (e.g., dollar amount received, time of day, profitability, etc.) to the promotional system, regardless of whether the sales information is related to a deal. As another example, data stored in the merchant database such as the particular products and services offered by the merchant or the price point of said products and services might be examined to assist with generation of a deal offer. For example, a hair salon charging $13 for a haircut and style might benefit from different deal offers than a hair salon charging $150 for a haircut and style, or a 5-star hotel might benefit from different deal offer structures than a 1 star motel. The non-deal analytics can then be analyzed by the promotional system to determine, for example, how busy the merchant is currently, when the merchant's busiest/slowest times are historically, when the merchant's most/least profitable times are historically, and/or any other sales-related information. The initial registration process may further include providing access to the merchant's point-of-sale or other relevant information to the promotional system, such that such data is made available to the promotional system for deal generation. Additionally or alternatively, the promotional system may derive such non-deal analytic data from various websites (e.g., a merchant website), services (e.g., review sites or marketing databases), and other information not provided directly by the merchant, but otherwise accessible by the merchant system.

At 1010, the processor can be configured to analyze the merchant's available product inventory or service availability (e.g., how many open tables at a restaurant, how many open appointments, etc.). Similarly, the processor can be configured to analyze the merchant's calendar and/or any other type of scheduler that is used to help the merchant keep track of inventory and/or service availability and, thus, determine when a merchant may be more likely to benefit from a deal being offered. For example, the merchant may incorporate a scheduling system such as a system as described in U.S. patent application Ser. No. 13/631,313 filed Sep. 28, 2012, titled "SCHEDULING APPOINTMENTS WITH DEAL OFFERS", which is herein incorporated by reference in its entirety.

At 1012, consumer transactions that are reported to the promotional system can also be weighed in the algorithm of process 1000 for generating proposed deal parameters. For example, the promotional system can be configured to determine for which prices and on what types of products consumers are purchasing in a geographic area of the merchant (e.g., within one block, one mile, five miles, ten miles, and/or any other selected distance from the merchant). As such, in response to the promotional system determining that consumers are purchasing umbrellas at a higher rate than historical norms (i.e., suggesting that it may be raining within a target region), discounts on taxicabs (which may encounter higher demand during rain periods) can be reduced or paused programmatically in response to a central promotional system determining a deal offer should be paused in the absence of receiving a merchant request to do so. As another example, in response to determining that consumers are purchasing golf clubs in a club house of a local golf club, deal parameters may be generated for a practice round at the golf club whereby such newly purchased clubs may be used.

At 1014, proposed deal parameters (such as those shown in FIG. 7) can be generated based on the results of the analyses of 1004-1012. In some embodiments, additional and/or different analyses may be included in process 1000. For example, the merchant may be provided with particular deal offers targeted for customers with certain characteristics. As such, deal offers might be generated that are targeted to new customers (e.g., customers who do not currently do business with the merchant), existing customers, customers in a certain proximity to the merchant's place of business, customers already in the physical store location, or the like. The merchant may be presented with a list of such offers tailored to these different customer types, such that the merchant may select, edit, and/or confirm a deal offer to attract a certain customer demographic. Further, some embodiments can skip to 1014 after performing fewer steps and/or after performing any of 1004-1012. As such, the process 1000 can generate proposed deal parameters based on various analytics related to the merchant's sales information, other merchant's sales information and/or consumer's purchasing information.

The process 1000 may then proceed to action 1016 and display the proposed deal parameters for the merchant's approval. For example, display 700 may be presented at 1016 when requested. The process 1000 ends at 1018.

FIG. 11 shows a process 1100, which is an example of an algorithm that may be used to monitor deal analytics that can be subsequently processed to provide new deal offers based on merchant self-service indicators (e.g., in accordance with process 900) and/or presented in a display, such as display 700 of FIG. 7. The process 1100 starts at 1102.

At 1104, a deal is offered. For example, the promotional system publishes an advertisement on a website, sends an email, pushes a notification and/or otherwise notifies one or more potential consumers that a deal is being offered.

At 1106, the promotional system and/or the merchant system can be configured to monitor sales and/or other analytics data associated with the deal offer. For example, at 1106, the promotional system can be configured to keep track how many deals have sold, the deal value, the discount value, how quickly the deals sold, where the deals are sold, what other deals were bought by the same or similar consumers, and/or any other data that may be analyzed by, e.g., processes 900 or 1000.

At 1108, merchant self-service indicators are determined for association with the deal offer. For example, the merchant that generated the deal may be associated with various merchant self-service indicators, and these indicators may be extracted and associated with the deal offer. As an example, the type of merchant, the size of the merchant, and the location of the merchant may be associated with the deal so that other merchants of a similar respective type, size, and location may analyze the deal and associated deal analytics to generate deal parameters for their own use.

At action 1110, the deal offer is associated with the identified merchant self-service indicators. This association may be tracked in a promotional database, such as a database that stores the deal offers, or in a merchant database, such as a database that stores information about particular merchants. In some embodiments, a promotional system operates to analyze and link data in a promotional database and a merchant database to identify correlations and other analytics for the purpose of generating parameters for deal offers. The process 1100 ends at action 1112 after associating the particular deal offer with the particular merchant self-service indicators of the merchant for which the deal was offered.

Figure 12:
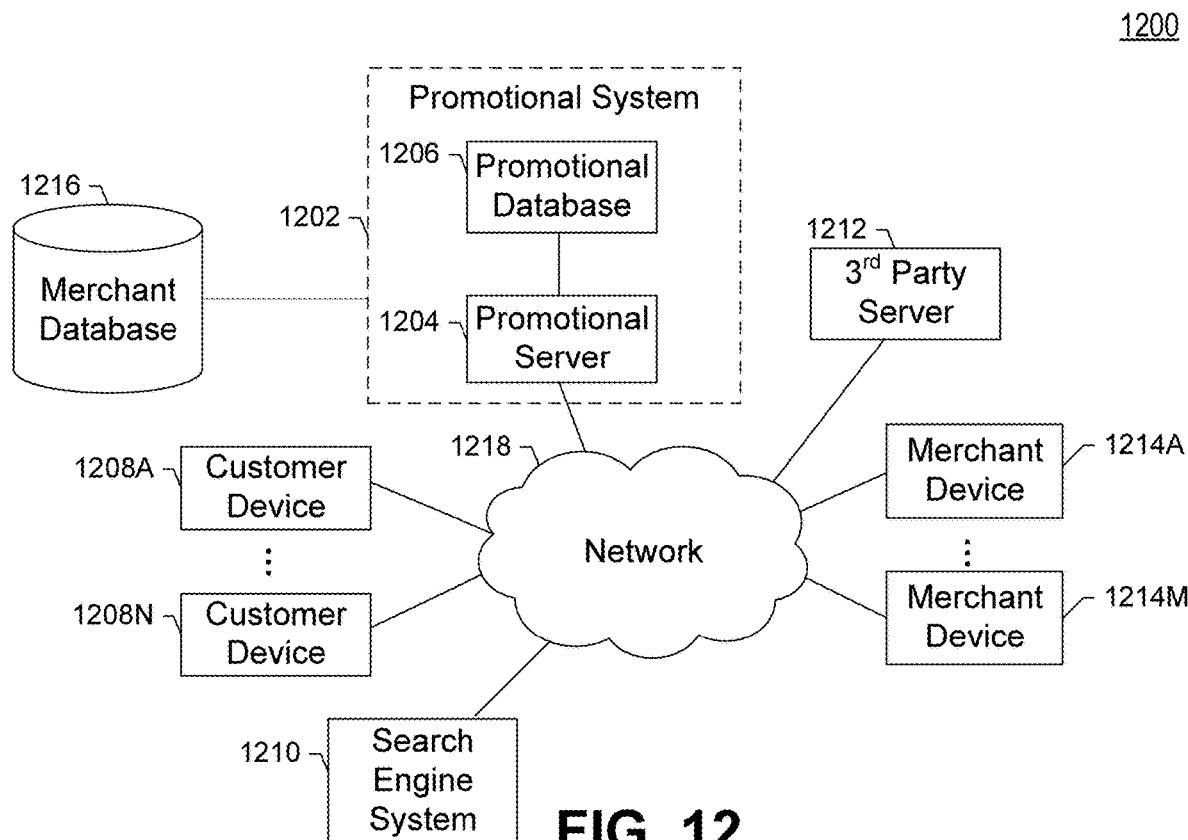
FIG. 12 shows an example system in accordance with some embodiments discussed herein.

FIG. 12 shows a system 1200 including an example of a network architecture for a retailing system, which may include one or more devices and sub-systems that are configured to implement some embodiments discussed herein. For example, the system 1200 may include a promotional system 1202, which can include, for example, a promotional server 1204 and a promotional database 1206, among other things (not shown). The promotional server 1204 can be any suitable network server and/or other type of processing device. The promotional database 1206 can be any suitable network database configured to store deal parameter data and/or analytics data, such as that discussed herein. In this regard, the promotional system 1202 may include, for example, at least one backend data server, network database, cloud computing device, among other things. The promotional system 1202 may be further coupled to a merchant database 1216. As described above, the merchant database 1216 may include information about one or more merchants for use in a verification operation as described above with respect to FIG. 9. The merchant database 1216 may be maintained by the promotional system 1202, or it may be external to the promotional system 1202. For example, the merchant database 1216 may be provided by a third party.

The promotional system 1202 can be coupled to one or more consumer devices 1210A-810N and/or one or more merchant devices 1212A-1212N via a network 1214. In this regard, the network 1214 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 1214 may include a cellular telephone, an 802.11, 802.16, 802.20, and/or WiMax network. Further, the network 1214 may include a public network, such as the Internet, a private network, such as an intranet, or combinations thereof, and may utilize a variety of networking protocols now available or later developed including, but not limited to TCP/IP based networking protocols.

The consumer devices 1210A-810N and/or the merchant devices 1212A-1212N may each be implemented as a personal computer and/or other networked device, such as a cellular phone, tablet computer, mobile device, etc., that may be used for any suitable purpose in addition to buying deals and/or offering deals for sale. The depiction in FIG. 12 of "N" consumers and "M" merchants is merely for illustration purposes. The system 1200 may also include at least one search engine system 1216 and/or 3rd party server 818, among other things.

Figure 13:
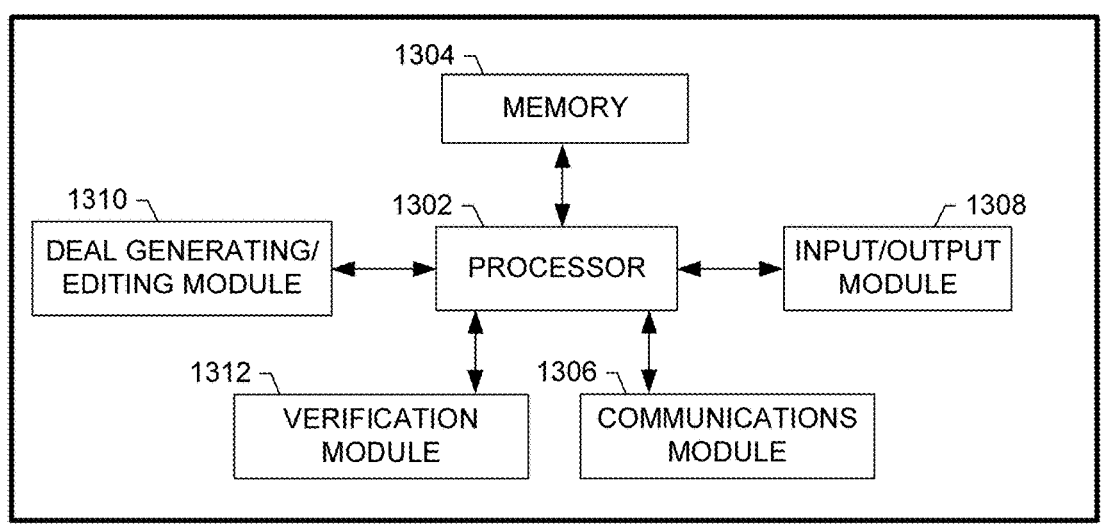
FIG. 13 shows a schematic block diagram of circuitry that can be included in a computing device, such as a merchant machine, consumer machine and/or promotional system, in accordance with some embodiments discussed herein.

FIG. 13 shows a schematic block diagram of circuitry 1300, some or all of which may be included in, for example, promotional system 1202, consumer devices 1208A-1208N and/or merchant devices 1214A-1214M. As illustrated in FIG. 13, in accordance with some example embodiments, circuitry 1300 can includes various means, such as a processor 1302, a memory 1304, a communications module 1306, and/or an input/output module 1308. In some embodiments, such as when the circuitry 1300 is included in merchant devices 1214A-1214M and/or promotional system 1202, the deal generating/editing module 1310 and a verification module 1312 may also or instead be included. As referred to herein, "module" includes hardware, software and/or firmware configured to perform one or more particular functions. In this regard, the means of the circuitry 1300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., a memory 1304) that is executable by a suitably configured processing device (e.g., a processor 1302), or some combination thereof.

Processor 1302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 13 as a single processor, in some embodiments the processor 1302 comprises a plurality of processors. The plurality of processors may be embodied on a single computing device or may be distributed across a plurality of computing devices collectively configured to function as the circuitry 1300. The plurality of processors may be in operative communication with each other and may be collectively configured to perform one or more functionalities of the circuitry 1300 as described herein. In an example embodiment, the processor 1302 is configured to execute instructions stored in the memory 1304 or otherwise accessible to the processor 1302. These instructions, when executed by the processor 1302, may cause the circuitry 1300 to perform one or more of the functionalities of the circuitry 1300 as described herein.

Whether configured by hardware, firmware/software methods, or by a combination thereof, the processor 1302 may comprise an entity capable of performing operations according to embodiments of the present invention while configured accordingly. Thus, for example, when the processor 1302 is embodied as an ASIC, FPGA or the like, the processor 1302 may comprise specifically configured hardware for conducting one or more operations described herein. Alternatively, as another example, when the processor 1302 is embodied as an executor of instructions, such as may be stored in the memory 1304, the instructions may specifically configure the processor 1302 to perform one or more algorithms and operations described herein, such as those discussed in connection with FIGS. 9-11.

The memory 1304 may comprise, for example, volatile memory, non-volatile memory, or some combination thereof. Although illustrated in FIG. 13 as a single memory, the memory 1304 may comprise a plurality of memory components. The plurality of memory components may be embodied on a single computing device or distributed across a plurality of computing devices. In various embodiments, the memory 1304 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 1304 may be configured to store information, data (including deal parameter data and/or analytics data), applications, instructions, or the like for enabling the circuitry 1300 to carry out various functions in accordance with example embodiments of the present invention. For example, in at least some embodiments, the memory 1304 is configured to buffer input data for processing by the processor 1302. Additionally or alternatively, in at least some embodiments, the memory 1304 is configured to store program instructions for execution by the processor 1302. The memory 1304 may store information in the form of static and/or dynamic information. This stored information may be stored and/or used by the circuitry 1300 during the course of performing its functionalities.

The communications module 1306 may be embodied as any device or means embodied in circuitry, hardware, a computer program product comprising computer readable program instructions stored on a computer readable medium (e.g., the memory 1304) and executed by a processing device (e.g., the processor 1302), or a combination thereof that is configured to receive and/or transmit data from/to another device, such as, for example, a second circuitry 1300 and/or the like. In some embodiments, the communications module 1306 (like other components discussed herein) can be at least partially embodied as or otherwise controlled by the processor 1302. In this regard, the communications module 1306 may be in communication with the processor 1302, such as via a bus. The communications module 1306 may include, for example, an antenna, a transmitter, a receiver, a transceiver, network interface card and/or supporting hardware and/or firmware/software for enabling communications with another computing device. The communications module 1306 may be configured to receive and/or transmit any data that may be stored by the memory 1304 using any protocol that may be used for communications between computing devices. The communications module 1306 may additionally or alternatively be in communication with the memory 1304, the input/output module 1308 and/or any other component of the circuitry 1300, such as via a bus.

Input/output module 1308 may be in communication with the processor 1302 to receive an indication of a user input and/or to provide an audible, visual, mechanical, or other output to a user (e.g., merchant and/or consumer). Some example visual outputs that may be provided to a user by the circuitry 1300 are discussed in connection with FIGS. 1-8. As such, the input/output module 1308 may include support, for example, for a keyboard, a mouse, a joystick, a display, a touch screen display, a microphone, a speaker, a RFID reader, barcode reader, biometric scanner, and/or other input/output mechanisms. In embodiments wherein the circuitry 1300 is embodied as a server or database, aspects of the input/output module 1308 may be reduced as compared to embodiments where the circuitry 1300 is implemented as an end-user machine (e.g., consumer device and/or merchant device) or other type of device designed for complex user interactions. In some embodiments (like other components discussed herein), the input/output module 1308 may even be eliminated from the circuitry 1300. Alternatively, such as in embodiments wherein the circuitry 1300 is embodied as a server or database, at least some aspects of the input/output module 1308 may be embodied on an apparatus used by a user that is in communication with the circuitry 1300. The input/output module 1308 may be in communication with the memory 1304, the communications module 1306, and/or any other component(s), such as via a bus. Although more than one input/output module and/or other component can be included in the circuitry 1300, only one is shown in FIG. 13 to avoid overcomplicating the drawing (like the other components discussed herein).

The deal generating/editing module 1310 may also or instead be included and configured to perform the functionality discussed herein related to generating and/or editing deal offers discussed above. In some embodiments, some or all of the functionality of generating and/or editing deal offers may be performed by the processor 1302. In this regard, the example processes and algorithms discussed herein can be performed by at least one processor 1302 and/or the deal generating/editing module 1310. For example, non-transitory computer readable media can be configured to store firmware, one or more application programs, and/or other software, which include instructions and other computer-readable program code portions that can be executed to control each processor (e.g., the processor 1302 and/or the deal generating/editing module 1310) of the components of the system 1200 to implement various operations, including the examples shown above. As such, a series of computer-readable program code portions are embodied in one or more computer program products and can be used, with a computing device, server, and/or other programmable apparatus, to produce machine-implemented processes.

For example, the deal generating/editing module 1310 can be configured to analyze multiple potential deal offers (e.g., including various combinations of days, times, products, durations, etc.) in view of known merchant needs (such as, e.g., needing to sell excess inventory, underutilized service appointments, and/or inventory about to expire) to recommend one (or a list) of potential deal offers to present to a merchant device. In this way, deal generating/editing module 1310 may support multiple ranking algorithms, such as those discussed above, so that the selected algorithm may be chosen at runtime. Further, the present configuration can enable flexibility in terms of configuring additional contexts.

In some embodiments, the deal generating/editing module 1310 iteratively scores potential deal offers and/or ranks a list of the potential deal offers. The promotional system 1202 may be configured to view one or more of the top potential deal offers, and the respective merchant device may be configured to display only the top potential deal offer. In some embodiments, the promotional system may likewise display only one or no potential deal offers and the merchant device may display none or a plurality of deal offers. The deal generating/editing module 1310 can be configured to access multiple deal offers, and generate initial scores for the multiple deal offers and/or an initial ranking of the multiple deal offers. In some embodiments, the multiple deal offers can be ranked in accordance with a promotional campaign strategy, wherein multiple deals are prescheduled and coordinated for the future. Thereafter, the deal generating/editing module 1310 can adjust the initial scores for the multiple deals and/or the initial ranking of the multiple deals at least once (and potentially multiple times). The deal generating/editing module 1310 may adjust the scores and/or the rankings of the deals in one or multiple ways. For example, the deal generating/editing module 1310 may use one or more correction factors in order to alter the initial scores or subsequent scores for the multiple deals and/or the initial ranking of the multiple deals or subsequent ranking(s) of the multiple deals. As another example, the deal generating/editing module 1310 may use one or more rules to adjust the initial scores, the subsequent scores, the initial ranking of the multiple deal offers, or the subsequent ranking(s) of the multiple deal offers (such as by excluding a deal based on a business rule).

In adjusting the initial scores, the subsequent scores, the initial ranking and/or the subsequent ranking(s), the deal generating/editing module 1310 may analyze consumer data, merchant data and/or deal data. For example, the deal generating/editing module 1310 may analyze merchant data during one scoring or one ranking of the multiple deal offers and analyze merchant data (or a different type of merchant data) during a subsequent scoring or a subsequent ranking. For example, a plurality of deals can be preconfigured over the course of days, weeks and/or some other time frame, wherein only one or a few variables (such as time, price, etc.) changes, and the other deal variables remain the same as a control. This may help deal generating/editing module 1310 to conduct market research and/or otherwise determine what the best deal offer is for a particular merchant. The merchant device may or may not include a user-configurable authorization feature to enable this and/or other features discussed herein.

The merchant data analyzed by the deal generating/editing module 1310 may be the same type of merchant data in the different scoring or ranking iterations. For example, the deal generating/editing module 1310 may analyze a first type of geographic data in order to generate scoring for the multiple deal offers or one ranking of the multiple deal offers, and may analyze a second type of geographic data in order to generate subsequent scoring or a subsequent ranking. In particular, the deal generating/editing module 1310 may use distance of the consumer(s) to a deal location to generate the initial scores for the multiple deal offers and/or an ranking(s) of the multiple deal offers, and use the location of the consumer(s) in a city to determine whether to modify the initial scores and/or to adjust the initial ranking of the multiple deals.

Alternatively and/or additionally, the deal generating/editing module 1310 may analyze different types of user data in the different scoring or ranking iterations. For example, the deal generating/editing module 1310 may analyze consumer and/or merchant data that does not include user past purchase history to generate scoring for the multiple deals and/or one ranking of the multiple deals, and may analyze consumer and/or merchant past purchase/sale history to generate subsequent scoring or a subsequent ranking (such as using past purchase history to modify the scores or to adjust an initial ranking of the deal offers). As another example, the deal generating/editing module 1310 may analyze merchant and/or consumer data that does not include merchant and/or consumer deal type preference(s) to generate scores for the multiple deals or one ranking of the multiple deals, and may analyze merchant and/or consumer deal type preference(s) to generate subsequent scoring or a subsequent ranking. As still another example, the deal generating/editing module 1310 may analyze merchant and/or consumer data that does not include any aspect of the consumer interest to generate scores for the multiple deals or one ranking of the multiple deals, and may analyze consumer interest (such a user's open rate of previous e-mails and/or a consumer's click rate of links) to generate subsequent scoring or a subsequent ranking.

The verification module 1312 may function to verify merchant identification information when registering merchants with a system, such as the promotional system 1202. The verification module 1312 may receive merchant identification information and determine a merchant associated with the merchant identification information, such as by performing a lookup operation using a merchant database. The verification module 1312 may be further configured to identify a contact method to verify that a user of the promotional system is authorized to generate deals for the merchant associated with the merchant identification information. For example, the verification module may function to provide a unique code to the merchant via a contact method identified in the merchant database, and to receive confirmation of the unique code via the promotional system, such as by the process described above with respect to FIGS. 1-9. Once the merchant identification information has been verified, the verification module 1312 may activate the ability to generate deals for a user that provided the merchant identification information.

The verification module 1312 may be further configured to determine if a merchant meets a minimum screening threshold for creation of deals using the promotional system. For example, the promotional system may employ metrics to ensure that only merchants that meet a certain criteria are allowed to provide deal offers using the promotional system. The verification module 1312 may thus identify merchant screening parameters for the merchant, and determine if those merchant screening parameters meet the minimum threshold for creation of deal offers. If the verification module 1312 determines that the merchant meets the minimum threshold, then the verification module 1312 may enable the ability to generate deal offers and provide said deal offers to consumers using the promotional system.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 1200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1302, deal generating/editing module 1310, and/or verification module 1312 as discussed above with reference to FIG. 13, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 1304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for generating a deal offer, the apparatus comprising at least one processor and at least one non-transitory memory comprising program code, wherein the at least one non-transitory memory and the program code are configured to, with the at least one processor, cause the apparatus to:
   identify merchant identification information, wherein identifying merchant identification information comprises:
      receiving a request for access to a merchant registration interface, wherein the request for access is associated with user interaction with a customized uniform resource locator associated with a merchant;
      generating the merchant registration interface, wherein the merchant registration interface comprises a plurality of entry fields configured for receiving merchant identification information;
      causing the merchant registration interface to be displayed on a visual display of a merchant device associated with a user; and
      receiving a set of user inputs, the set of user inputs comprising user interactions associated with at least one of the plurality of entry fields of the merchant registration interface;
   based on the merchant identification information, verify that the user is an authorized representative of the merchant associated with the merchant identification information;
   determine one or more merchant screening parameters associated with the merchant, wherein at least one of the one or more merchant screening parameters is determined by an external system such that determining one or more merchant screening parameters associated with the merchant comprises communicating with the external system;
   determine whether a programmatic analysis result of the one or more merchant screening parameters satisfies a merchant screening threshold for generating a deal offer;
   in an instance in which the programmatic analysis result of the one or more merchant screening parameters fails to satisfy the merchant screening threshold for generating a deal offer, generate and cause display of an ineligibility notification data structure at the merchant device associated with the verified merchant, the ineligibility notification data structure comprising an embedded selectable link configured to open an electronic messaging application;
   in an instance in which the programmatic analysis result of the one or more merchant screening parameters satisfies the merchant screening threshold for generating a deal offer:
      determine one or more merchant self-service indicators based on the merchant identification information;
      programmatically generate, using the at least one processor, a suggested deal offer data structure based on at least the one or more merchant self-service indicators;
      generate and cause display of a merchant self-service interface at the merchant device associated with the verified merchant, the merchant self-service interface based on the suggested deal offer data structure;
      update the suggested deal offer data structure based on one or more deal offer revision requests received from the merchant device; and
      cause transmission, by electronic communication, via a network, at least one deal offer based on the updated suggested deal offer data structure to at least one consumer device, the deal offer configured for display on the consumer device.

2. The apparatus of claim 1, wherein the at least one non-transitory memory and the program code are further configured to, with the at least one processor, cause the apparatus to:
   retrieve one or more items of merchant identification information from a merchant database based on the customized uniform resource locator.

3. The apparatus of claim 2, wherein generating the merchant registration interface comprises pre-populating one or more of the plurality of entry fields of the merchant registration interface with the retrieved one or more items of merchant identification information.

4. The apparatus of claim 1, wherein identifying merchant identification information further comprises:

accessing one or more browser cookies associated with a browsing session of the merchant device associated with the user; and determining one or more items of merchant identification information based on at least the one or more browser cookies.

5. The apparatus of claim 1, wherein identifying merchant identification information further comprises:

identifying an internet protocol address associated with the merchant device associated with the user; and determining one or more items of merchant identification information based on at least the internet protocol address.

6. The apparatus of claim 1, wherein verifying that the user is an authorized representative of the merchant associated with the merchant identification information comprises:

querying a merchant database based on one or more items of the merchant identification information to identify a contact method for the merchant;

initiating contact of the merchant via the identified contact method;

providing a verification code via the identified contact method; and receiving the verification code from the merchant device associated with the user.

7. The apparatus of claim 1, wherein the one or more merchant screening parameters comprise at least one of a merchant size, a merchant age, a merchant review score, a merchant social networking metric, a merchant credit score, and a merchant risk model.

8. The apparatus of claim 1, wherein the programmatic analysis result comprises a merchant quality score such that determining whether the programmatic analysis result of the one or more merchant screening parameters satisfies the merchant screening threshold for generating a deal offer comprises determining whether the merchant quality score satisfies the merchant screening threshold for generating a deal offer.

9. The apparatus of claim 1, wherein determining one or more merchant self-service indicators based on the merchant identification information comprises:

analyzing the merchant identification information to cull the one or more merchant self-service indicators from the merchant identification information.

10. The apparatus of claim 1, wherein determining one or more merchant self-service indicators based on the merchant identification information comprises:

querying a merchant database based on one or more items of the merchant identification information to identify the one or more merchant self-service indicators.

11. The apparatus of claim 1, wherein determining one or more merchant self-service indicators based on the merchant identification information comprises:

accessing one or more external websites or databases based on one or more items of the merchant identification information to identify the one or more merchant self-service indicators.

12. The apparatus of claim 1, wherein programmatically generating a suggested deal offer data structure based on at least the one or more merchant self-service indicators comprises:

selecting one or more deal parameters and one or more deal content items from one or more deal offers previously offered by at least one other merchant, wherein the at least one other merchant comprises at least one self-service indicator in common with the one or more merchant self-service indicators.

13. The apparatus of claim 12, wherein the one or more deal parameters are structural properties of the suggested deal offer data structure.

14. The apparatus of claim 12, wherein the one or more deal content items are cosmetic display properties of the suggested deal offer data structure.

15. The apparatus of claim 1, wherein the at least one non-transitory memory and the program code are further configured to, with the at least one processor, cause the apparatus to:

monitor sales activity associated with the at least one deal offer.

16. The apparatus of claim 1, wherein the at least one non-transitory memory and the program code are further configured to, with the at least one processor, cause the apparatus to:

associate the one or more merchant self-service indicators of the merchant with the at least one deal offer in a promotions database.

17. The apparatus of claim 1, wherein programmatically generating the suggested deal offer data structure is based on at least the one or more merchant self-service indicators and an analysis of an available product inventory or service availability of the merchant.

18. The apparatus of claim 1, wherein the at least one deal offer transmitted to the at least one consumer device comprises a quick recognition (QR) code enabling redemption of the corresponding deal offer at the merchant.

* * * * *